INVENTORS
STANLEY H. HUNKINS,
GEORGE W. HERNAN &
PETER W. BERESIN
BY Millman and Jacobs
ATTORNEYS

INVENTORS
STANLEY H. HUNKINS,
GEORGE W. HERNAN &
PETER W. BERESIN

BY Millman and Jacobs

ATTORNEYS

INVENTORS
STANLEY H. HUNKINS,
GEORGE W. HERNAN &
PETER W. BERESIN
BY Millman and Jacobs
ATTORNEYS INVENTORS.
STANLEY H. HUNKINS,
GEORGE W. HERNAN &
PETER W. BERESIN
BY Millman and Jacobs
ATTORNEYS

SHIFT REGISTER CONTROLLED MARKET TICKER INFORMATION DISPLAY

Filed Jan. 7, 1963 5 Sheets-Sheet 5

INVENTORS
STANLEY H. HUNKINS,
GEORGE W. HERNAN &
PETER W. BERESIN
BY Millman and Jacobs
ATTORNEYS United States Patent Office 3,416,133

Patented Dec. 10, 1968

3,416,133

SHIFT REGISTER CONTROLLED MARKET TICKER INFORMATION DISPLAY

Stanley H. Hunkins, Merchantville, and George W. Hernan, Haddonfield, N.J., and Peter W. Beresin, Philadelphia, Pa., assignors to Ultronic Systems Corp.

Filed Jan. 7, 1963, Ser. No. 249,623
9 Claims. (Cl. 340—154)

This invention relates to market ticker lines and particularly to a system for use with such ticker lines to display the stock or commodity quotations that are commonly supplied to brokers' offices by such lines.

The presently existing system for transmitting stock and commodity quotations from exchanges and markets to stock brokers is via telegraph or "ticker" lines, and mechanical printers are used to provide a tape record of the quotations. For purposes of projecting the ticker tape in a large room, an optical system is used in which the characters move across a screen as the ticker tape moves through the projector. Even at present slow ticker speeds, it is difficult to follow the information as it moves across the screen. In addition, the tape must be changed periodically, and the used tape gathered up and discarded. Moreover, the ink printing on the tape is often not uniform and difficult to read when projected.

It is an object of this invention to provide a new and improved ticker display system.

Another object is to provide a ticker display system which operates quietly without moving mechanical parts.

Another object is to provide a new and improved ticker display system which can be accommodated to both present slow ticker transmission speeds and higher speeds.

Another object is to provide a new and improved ticker display system in which full quotations are projected for a substantial time period.

Another object is to provide a new and improved ticker display system which can be readily adapted to display the characters presently used and any new character that may be used.

Another object is to provide a ticker display system which is reliable and effective in operation.

In accordance with an embodiment of this invention, an all electronic ticker display system is provided. A plurality of row displays are provided, each of which has a plurality of sections that present the several characters which form a stock quotation. The character sections are each formed of a plurality of segments that may be combinatorially energized to present any of the characters used in a quotation. Electronic circuits are provided for registering characters from the serially transmitted bits and for placing those characters in a suitable electrical form to operate the display segments. The character sections of a display row are successively operated to present the successive characters of a quotation and to maintain the display thereafter. The display rows are operated successively so that generally each quotation may be set up on a separate display. The displays are operated in a cycle and erased in time to receive the next quotation.

The foregoing and other objects of this invention, the features thereof as well as the invention itself, may be more fully understood from the following description when read together with the accompanying drawing, in which.

In the drawing, corresponding parts are referenced by similar numerals throughout.

Figure 1:
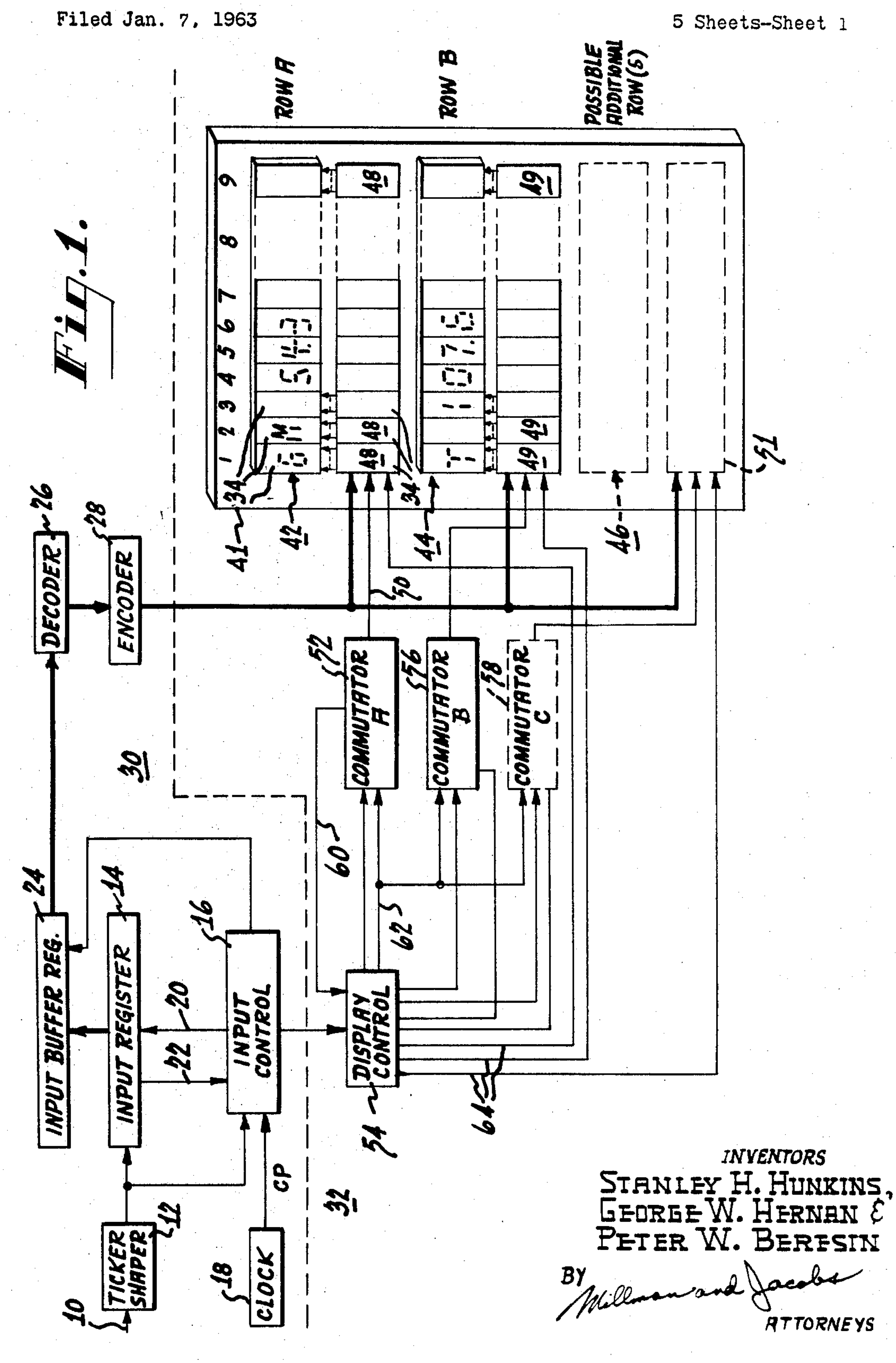
FIG. 1 is a schematic block diagram of a ticker display system embodying this invention.

In the overall system diagram of FIG. 1, the signals from the conventional telegraph ticker line 10 are supplied serially to a ticker shaper circuit 12 which places the signals in a suitable form for use by the remainder of the system. The shaped signals are serially supplied to an input shift register 14 and also to an input control 16. A clock generator 18 supplies clock pulses to the input control 16 to establish the timing of the system. The input control 16 also receives the bits of each character and supplies pulses to the input register 14 via line 20 to establish successive bits in that register. When a full character is established in the register 14, the input control 16 recognizes this condition via line 22 and supplies a signal to an input buffer register 24 to transfer thereto in parallel the signals established in register 14.

The signals from the input register 24 are supplied to a decoder 26 where they are decoded from the standard 6-bit combinatorial code used by the ticker to a 1-out-of-64 code. An encoder 28 receives the output lines of the decoder 26 and places the signals in a combinatorial form which, in the embodiment illustrated, is made up of 15 parallel bits suitable for operating the 15 segments of the particular display system that is used. The portion of the system described thus far operates as the input section 30 thereof. The display section 32 is separated from the input section 30 by a broken line.

Figure 2:
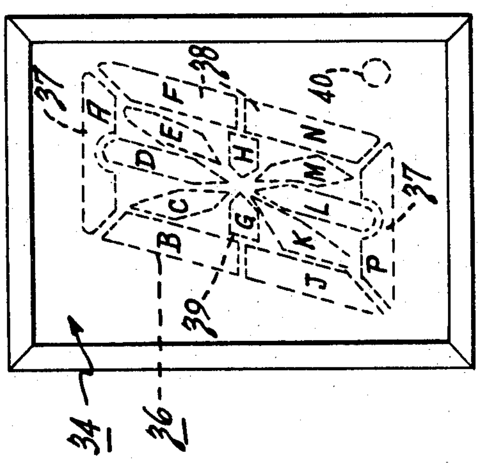
FIG. 2 is a schematic diagram of the face of a character section of the displays of FIG. 1.

An example of a suitable segmental display section 34 that may be used in this system is shown in FIG. 2. This display is of the electroluminescent type and is commerically available. It is formed as a parallelogram 36 with individual segments 37 for the top and bottom sides, pairs of segments 38 for the left and right sides, and radial segments 39 from the center to the side midpoints and corners of the parallelogram 36. In addition, the face of the display section includes a circular segment 40 to form a dot to the right of the parallelogram 36. By energizing suitable combinations of these segments any desired numeric or alphabetic character may be formed. A display unit is formed by a row 42 of twelve character sections 34 mounted on a panel 41 (FIG. 1). These twelve sections are sufficient to display any individual quotation customarily transmitted by a ticker. A second row display 44 of the same form is provided, and a third 46 or additional rows may be provided if desired.

Individually associated with each display section 34 is a storage section 48 having a plurality of storage circuits, each of which individually operates a segment of the parallelogram 36 and dot 40 which form the associated character display. Thus, there are fifteen storage circuits in each section 48, and these fifteen storage circuits of each section are individually connected to corresponding ones of the fifteen lines from the encoder 32.

Each of the fifteen storage circuits of the first section 48 in row A is connected to an output line 50 of a commutator 52. In a similar fashion, each of the storage circuits of each of the other sections 48 are connected to different lines (not shown) from commutator 52. The commutator 52 is stepped by signals received from a display control 54 which, in turn, receives timing signals from the input control 16 each time a character is established in the input register 14. The display control 54 is thereby effective to step the commutator 52 to successively enable each section 48 of storage circuits.

Each time a character is established in the input buffer register 24, it is supplied to one of the storage sections 48 for storage, and successive characters are supplied to successive storage sections so that the display character sections present the associated character. When a full quotation has been displayed, the commutator 52 supplies a signal to the display control 54 which then similarly operates a second commutator 56. The latter commutator 56 is associated with the storage sections 49 of the row B display 44 and operates these circuits in a similar fashion. A third commutator 58 is provided for the storage sections 51 of the row C display 46 if one is used, and so on for any additional rows. Each time a new quotation is started, the display control enables the commutator for the next display row via line 62, disables the others, and also supplies a destroy storage signal via the associated one of the lines 64 to the appropriate row of storage sections 48, 49, 51 that is to receive the new quotation. Thus, the display control 54 is effective to operate successively the commutators 52, 56, and 58 to control the presentation of the successive quotations in the successive display rows 42, 44, and 46 respectively. For any one quotation, the control 54 operates the appropriate commutator to steer the successive characters presented by the encoder 32 to the appropriate character sections 34 of the operating display. The storage section 48, 49, or 51 for each character maintains the display of the character until the display control 54 initiates the erase or destroy storage action as a preliminary to the display of another quotation in that row.

As will be apparent from the more detailed description hereinafter, each row 42, 44, 46 of the display normally holds one individual stock transaction. This is presented in suitable form by the identifying alphabetic characters for the stock code followed by a blank space and the transaction volume and price as the information is provided by the ticker (see FIG. 1). Each of the display rows operates in turn and displays its transaction until the cycle demands that a new transaction be presented; at that time the row is cleared of all characters, and the new information is displayed, character-by-character as it arrives from the ticker. If less than the twelve available display characters are used for a transaction, the remainder is left blank, and the next transaction begins on the succeeding row. If more than twelve characters are contained in any one transaction, the remaining characters are continued on the following row until the transaction is completed. Because of the versatility of the segmental display, all of the characters are shown on the same line without moving them to upper or lower case as in the ordinary printed ticker tape. In addition, certain simplifications may be provided in the characters that are displayed; e.g. the lower case "s" is presented as a slash, no dots are displayed, and fractions are indicated as the numerator of an equivalent eighth fraction which is preceded by a period. The segmental type of display permits the composition of any desired character by an appropriate selection of segments.

The conventional ticker code format provides for an 8-bit combinatorial character presented serially by the signals on the ticker line. The ticker line assumes two levels in the form of a mark or space, and during a lapse in transmission, the line assumes a mark condition. The first bit of each character is always a space, and the last is always a mark to identify the character position. The remaining six bits of the 8-bit character are coded to represent letters of the alphabet, numbers, and special symbols. In addition, the sixth bit is used for the special function of denoting upper or lower case characters.

Figure 3:
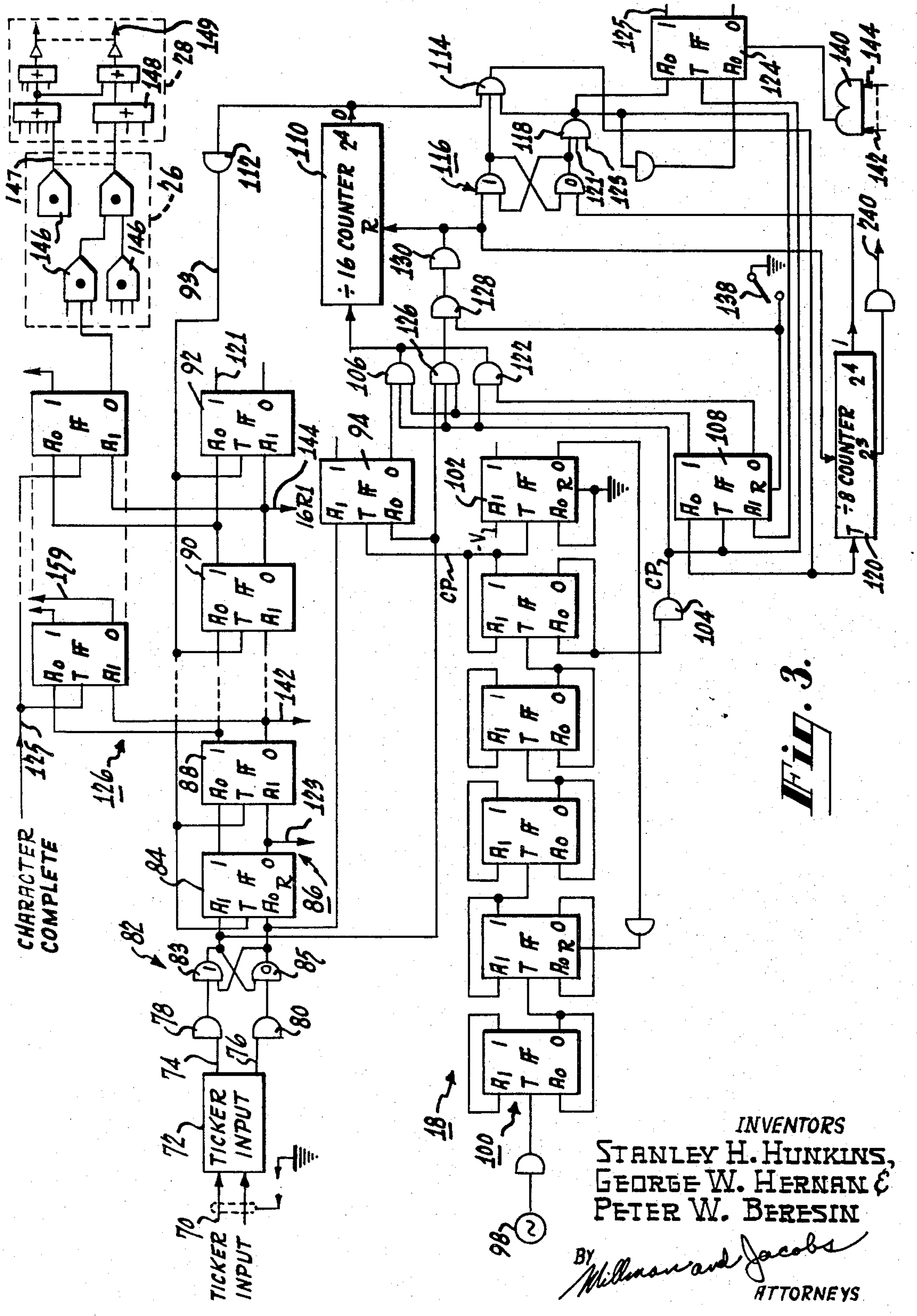
FIG. 3 is a schematic block diagram of the input section of the system of FIG. 1.

The detailed logic of the input section 30 of the system is shown in FIG. 3. The signals on the ticker line 70 are supplied to a ticker shaper 72 which forms them into suitable voltage waveforms for operation of the logic of the input section 30. The ticker shaper 72 supplies the signals in paraphase form on two lines 74 and 76 (for example, by means of a suitable transformer) and thereby to two inverters 78 and 80. The symbol for the inverters 78 and 80 is used to represent a module having three inputs and an output. This module functions as a binary inverter when only one of the inputs is used, and functions as a NOR gate when two or all three inputs are used. The signals are in the form of high (ground) or low (negative) voltage levels respectively representing binary "1" and "0." A suitable circuit that may be used for these logic gates and other circuits employed herein are shown in the patent application of Hernan et al., Ser. No. 149,913, filed Nov. 3, 1961.

The outputs of the inverters 78 and 80 are supplied to opposite sides of a flip-flop 82 formed by two NOR gates 83 and 85 which are cross-coupled to provide a bistable multivibrator. The flip-flop 82 is reset by a mark signal and set by a space signal. The 1- and 0-outputs of the flip-flop 82 are respectively supplied to the 1- and 0-inputs $A_1$ and $A_0$ of a flip-flop 84 which forms the first stage of an 8-stage shift register 86. All of the stages 84, 88, 90, 92 of the shift register are the same (and the third through sixth stages are omitted for simplicity of presentation).

The flip-flop 84 is a module used throughout the logic and is formed by a circuit that includes two cross-coupled NOR gates (of the type shown by flip-flop 82) together with a steering circuit for steering a positive-going trigger pulse applied to the T-input in accordance with the voltage levels applied to the 1- and 0-inputs. The flip-flop is set by such a trigger pulse when high and low voltage levels are respectively applied to the 0- and 1-inputs; and it is reset when the opposite voltage levels are applied to those inputs. The levels at the 0- and 1-outputs of each flip-flop are the inverted form of the corresponding inputs; that is, the 0- and 1-outputs are respectively low and high voltage levels when set (to represent a binary "1"), and these outputs are respectively high and low when reset (to represent a binary "0"). In addition, the flip-flops have an R-input which resets the flip-flop when a high voltage signal is applied thereto. The shift register 86 is formed by cascading the flip-flop stages, with the 1- and 0-outputs of each respectively connected to the 0- and 1-inputs of the next, and with the T-inputs connected in parallel to a common shift-pulse line 93.

The 1- and 0-outputs of the flip-flop 82 are also applied to the corresponding inputs of a detect-space flip-flop 94. This flip-flop is set and reset, when triggered, by a space and mark, respectively. The flip-flop 94 is triggered by a clock pulse (CP) which is supplied by the clock generator 18. The latter includes a crystal controlled oscillator 98 operating at a 32 kc. rate, the output of which is supplied via an amplifier to the T-input of the first stage of a 5-stage binary counter which acts as a frequency divider. Each stage of the binary counter is formed by a flip-flop of the type described above in which the 1- and 0-outputs are respectively connected to the 1- and 0-inputs of the flip-flop to provide a change of state of the flip-flop upon receipt of successive trigger pulses. The stages of the counter 100 are cascaded by connecting the 0-output of each stage to the T-input of the succeeding stage (except for the second stage, in which the 1-output is connected to the T-input of the succeeding stage; this connection of the stage permits it to be actuated separately by way of the R-input of that stage). The counter 100 functions as a normal binary counter through a count of 16 at which the last stage is set, and the 1-output thereof triggers a flip-flop 102. The latter FF–102 is connected as a pulse former which develops a pulse at its 0-output that is used to reset the second stage of the counter 100. Thereby, the counter operates to reset the last stage upon registering the count of 30. Thus, a positive-going CP pulse is developed at the 1-output of the last counter stage when it is set, and this condition is repeated at a division of the 32 kc. frequency by the count of 30. The generation of the clock CP pulse is also provided from the 0-output of the last counter stage and inverted to positive-going form by the inverter 104.

The flip-flop 102 operates as a pulse-former due to the 1- and 0-inputs thereof being respectively connected to negative and ground potential levels, and the R-input being connected to ground. As a consequence, this flip-flop is set when triggered by a positive-going pulse, and automatically reset thereafter.

Between characters, the ticker line 70 is in the mark state (except when a spurious space signal may be generated), and the flip-flops and counters of the input section 30 are normally in a reset condition. When a space appears on a ticker line, the next CP pulse triggers the detect space flip-flop 94 to set it. The 0-output of FF–94 enables gate 106 together with the 1-output of a lock-on-space flip-flop 108, which is then in the reset condition. Accordingly, the next CP pulse thereafter is passed by the gate 106 to trigger the 4-stage (binary counter) 110 (the stages of which are similar to those described above in connection with the counter 100 and cascaded in a similar fashion to provide a count of 16). This counter also acts as a pulse frequency divider.

Successive CP pulses continue to pass the gate 106 and trigger and step the counter 110 until a count of 8 is reached. At that time, the 0-output of the fourth stage of that counter goes low. This latter signal is changed to a positive-going trigger pulse by inverter 112 and applied as a "shift" signal via line 93 to the T-inputs of all the stages of the input character register 86. At that time, the first space signal is present at the inputs of the first stage 84, and the trigger pulse is effective to set that first stage and establish the space signal therein.

The repetition frequency of the CP pulses from the clock generator 96 is chosen to be sixteen times the information bit rate from the ticker line. Accordingly, the count of 16 in counter 110 corresponds essentially to the duration of an input signal bit (see FIG. 4). The first CP pulse that is generated after receipt of a space signal sets the detect space FF–94, and the second CP pulse starts the count of 16 in counter 110. Accordingly, the count of 8 in counter 110 occurs substantially at the center of that first space signal, which is at a time when the input signal should be established quiescently at the first stage 84, and the shift pulse is effective to sample the input signal at about the middle thereof. Thereby, reliable sampling of the ticker line signals is ensured and spurious signals are eliminated.

For faster ticker rates, the CP generator can be readily adapted to provide an increased clock pulse rate by removing one or more stages of the counter 100. Likewise, the counter 110 can be modified to provide fewer stages and still generate a shift pulse at approximately the center of the information bits coming from the ticker.

The count-of-8 pulse generated by the counter 110 is also passed by gate 114, enabled by the 1-output of a character-search flip-flop 116 (which is then reset). The output of gate 114 is effective to set lock-on space FF–108 when the next CP pulse is supplied via inverter 104. The positive-going pulse passed by gate 114 is also effective to trigger a 3-stage binary counter 120.

When the lock-on space FF–108 is set, the 1-output thereof closes gate 106, and the 0-output thereof enables gate 122 which passes CP pulses from inverter 104 to trigger the counter 110.

The process continues in the same manner, and at each count of eight (recurring at each set of sixteen CP pulses), the counter 110 supplies a shift pulse to enter in a new bit of information into the first stage 84 of the register 86 and to step the previous bits into corresponding stages. Since the ticker line is closely controlled during the transmission of an 8-bit character, the synchronism between the ticker line and the input logic 30 is ensured during that time, and reestablished at the beginning of each such character.

Figure 4:
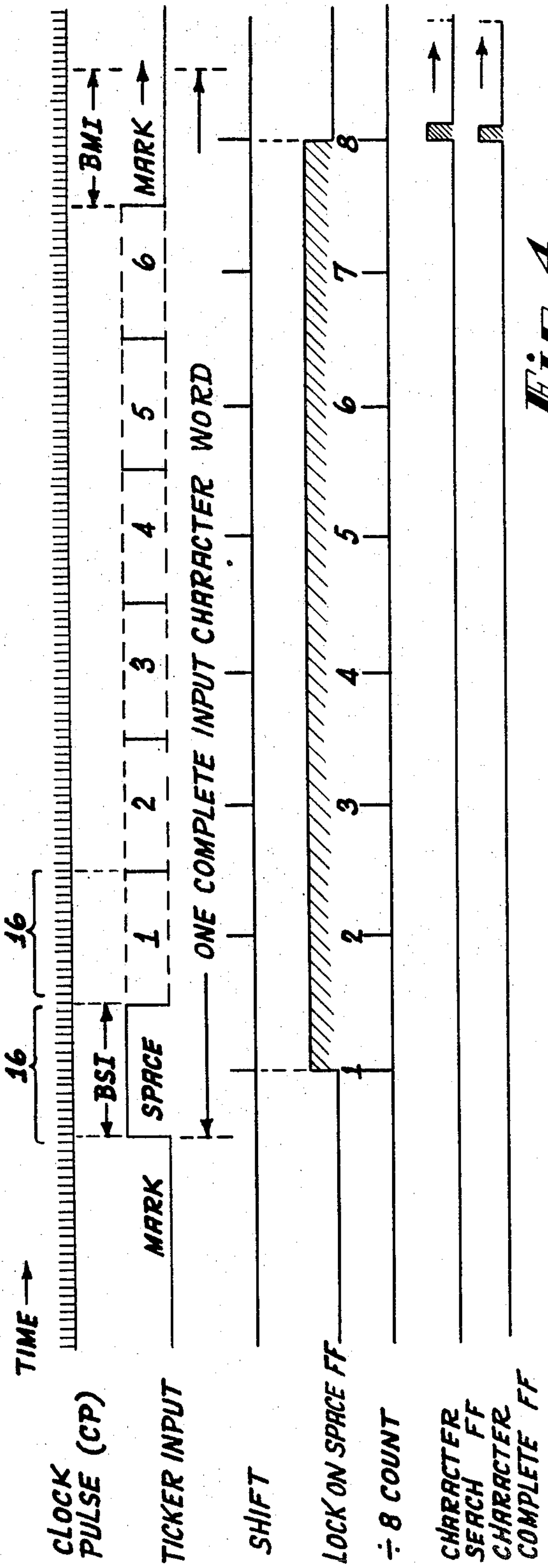
FIG. 4 is an idealized graphical diagram of the time relationship of the signals occurring in the input section of FIG. 3.

Each time a bit is entered into the register 86, the counter 120 is stepped, and when it is stepped to a count of 8, the 1-output of the last ($2^4$) stage goes high to set the character-search FF–116 (formed by a pair of NOR gates), as shown in FIG. 4. As a result, the gate 114 is disabled to stop the flow of trigger pulses to the counter 120. At the same time, the 0-output of FF–116 enables gate 118 which also receives the 1-output 121 of the last stage 92 of input register 86, as well as the 0-output 123 of the first stage 84. These latter inputs to gate 118 are both low when the first bit of the 8-bit character established in the input register 86 is a space and when the last bit is a mark. The output of gate 118 under these conditions provides a character-ready signal which sets a character-complete flip-flop 124 (see FIG. 4) when triggered by the next CP pulse. A character-complete signal at the 1-output 125 thereof is applied as the trigger input to each of the stages of a 6-stage buffer register 126 (only the first and last of which are illustrated). These stages respectively receive the six bits (which make up the actual coded character from the ticker) from the intermediate six stages of the register 86, i.e. from stages 88–90.

The buffer register 126 is provided if any substantial time period is required for utilization of the input character. That is, if the circuits in the remainder of the system utilizing the information require more than several milliseconds, the input buffer register 126 insures that this time is available. If a relatively short time is required, the input buffer register 126 may be dispensed with, and the input shift register 86 used directly. Thus, under either mode of construction and operation, the input register is immediately ready to receive the next input character from the ticker line once the character-complete signal has been generated and the information transferred.

The ticker code is such that the occurrence of a space on the first and a mark on the last of the 8-bit character does not occur except when a full 8-bit character is established in the input register 86. Due to asynchronous operation (for example, at the start of operation) or due to a spurious space signal that occurs on the ticker line, the counter 120 may start counting other than at the initial space of a true character. Consequently, the character-search FF–116 may be set at some out-of-synchronous condition. However, gate 118, by looking at the states of the first and last stage 84 and 92 of input register 86, assures that the character-ready signal is not generated until a true character is established in that register. This variable time of set of the character-search flip-flop is represented by the arrow in FIG. 4. However, the character-search FF–116 remains set once a count of 8 is reached, and, as successive bits are entered into the input register 86, the gate 118 continues to check the first and last stages 84 and 92. When the true character is established in the register 86, the character-ready signal is generated and the cycle completed in the manner indicated.

Due to the machine being turned on at random, or due to a noise condition generating space signals on the line, it is conceivable that the character-search FF–116 may be set and the gate 118 may generate a character-ready signal when, in fact, a true character is not established in the input character register. For example, the eight bits established in the input register 86 may be parts of two successive characters or a part of one character plus some noise. Under these conditions, a spurious character would be recognized. However, this would be but momentary, and the condition would not continue. For after one or more succeeding characters involving this spurious condition, a space and mark would not occur in the first and eighth positions of the input character, the character-ready signal would not be generated even though the character-search flip-flop 116 is set. Thereafter, as successive bits are brought into the input register, the space and mark conditions are again sampled, and ultimately a character-ready signal is generated that corresponds to a true character. From then on synchronization continues.

The character-ready signal from gate 118 also enables the 1-input of the lock-on space FF–108 so that it is reset by the next CP pulse. Consequently, gate 122 is disabled to stop the flow of further CP pulses to the counter 110. Also, a gate 126 is enabled by FF–108 and by the mark signal occurring between characters, which is then present at the first stage 84 of the input register 86. Accordingly, the next CP pulse is passed by the gate 126 and by the inverters 128 and 130 to reset the counters 110 and 120 and the character-search FF–116. Consequently, the character-ready signal at the output of gate 118 goes low, which permits the next clock pulse to reset the character-complete FF–124.

The input section 30 is then in reset condition and ready to receive the next space signal indicating the beginning of a new character. The mark signal remains at the input of the logic until the first bit of a new character appears, i.e. a space, at which time the above described cycle is repeated.

A manual reset switch 138 is provided for connecting selectively the R-input of lock-on space flip-flop 108 to ground to reset that flip-flop as well as to provide a high voltage input to inverter 128 to provide the resets for the counters 110 and 120 and the character-search flip-flop 116.

A 6-input NOR gate 140 has its output connected to the R-input of the character flip-flop 124 and receives as inputs the 0-outputs 142–144 of the second through seventh stages 88, 90 of the input register 86. Thereby, a "rubout" character established in the input register 86 is recognized, which is one that is made up of 6 mark signals and which represents no information but appears in a true character format that would normally set the FF–124. However, gate 140 resets FF–124 to prevent the transmission of that charter to the display.

The counter 120 also has an output at the 0-output of the third stage, which signal, when inverted, is used as a "blank" signal in the second section 32 of the logic.

The decoder 26 may be constructed in any number of suitable ways well known in the art. A preferred decoder 26 is composed of a plurality of gates 146 which receive different combinations of the two outputs of each of the six stages of the buffer register 126. These gates 146 provide a signal on one of sixty-four lines 147 that represent the sixty-four different characters combinatorially represented by the 6-bit ticker code. Simple diode gates connected in two levels of logic have been found to be suitable for this purpose.

The encoder 28 encodes the sixty-four outputs 146 from the decoder 26 into a combinatorial 15-bit code to provide an appropriate combinatorial energization of the segments making up each display character 34. For this purpose simple OR gates or buffer circuits 148 are provided to collect all of the decoder outputs that correspond to the individual ones of the fifteen lines 149 or display segments 37, 38, 39 (which are labelled A to R to indicate their individuality). With suitable output amplifiers the fifteen lines 149 are driven for operation of the storage sections 48, 49, 51.

The characters may often be formed with various alternatives in choice among the segments 37–39. For example, a numeral 2 may be formed by illuminating segments A, F, H, G, J, and P, or segments A, F, H, K, and P. Whichever form is chosen, the encoder 28 is arranged accordingly. By means of a minor change in the encoder, a character's form can be readily changed, or new characters may be added.

Figure 5:
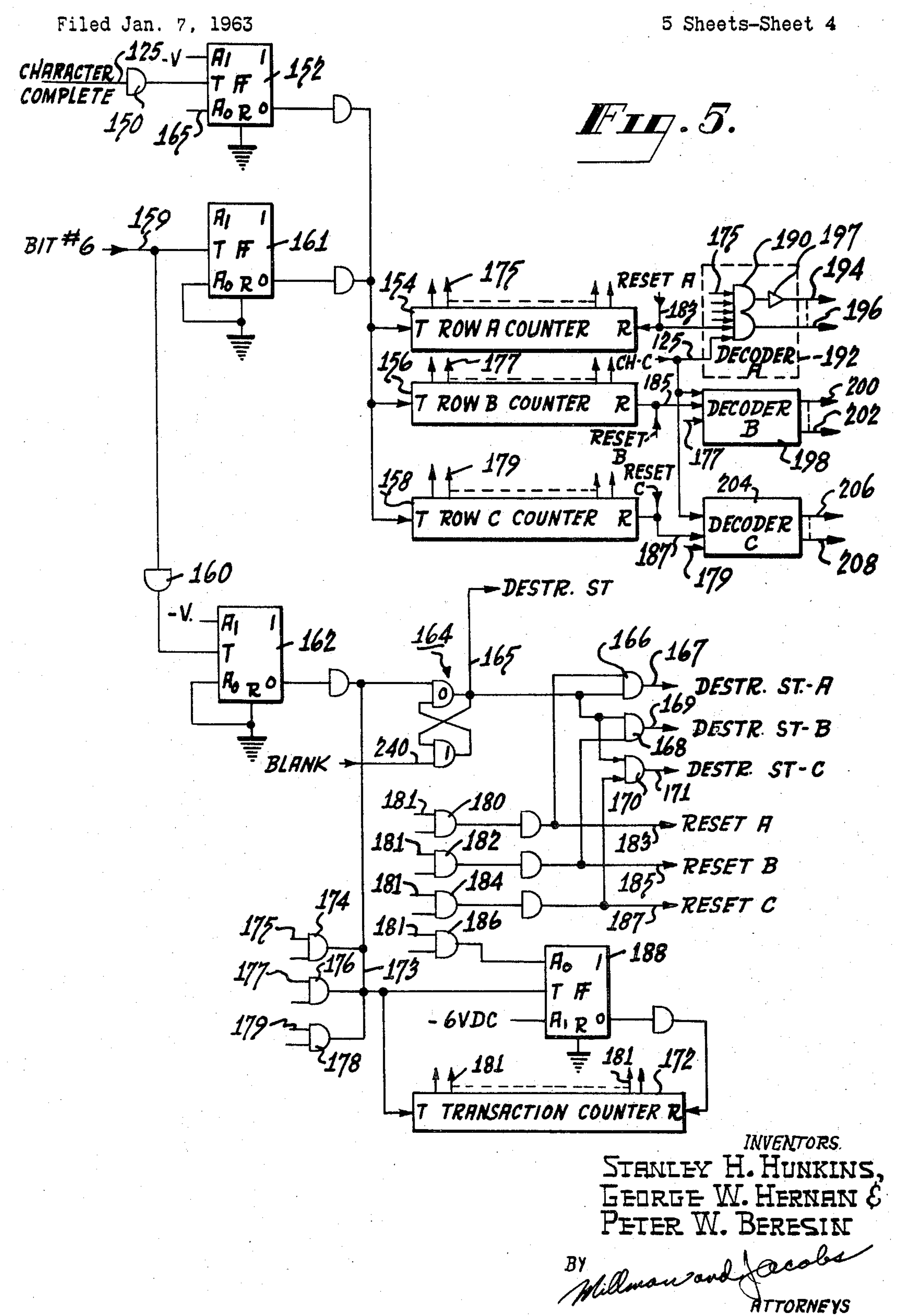
FIG. 5 is a schematic block diagram of a portion of the display section of FIG. 1.

The control logic for the display section 32 is shown in FIG. 5. The character-complete signal generated in the input logic section 30 is applied via an inverter 150 to the trigger input of a flip-flop 152 which has its 1-input connected to a negative direct voltage and its R-input grounded so as to function as a pulse-former for the character-complete signal. The 0-input of FF–152 receives a destroy-storage signal on line 165 under certain conditions, which has the effect of maintaining the 0-input of FF–152 at a low signal level to prevent the operation of that flip-flop as a pulse-former and effectively prevent the passage of the character-complete signal. The 0-output of FF–152 is inverted and applied to the T-inputs of three Row counters 154, 156, 158, each of which is a 4-stage binary counter of the type described above, and which are respectively associated with the three rows of the display. The inverter 150 has the effect of changing the leading edge of the character-complete signal to negative-going and the trailing edge to positive-going so that the pulse-former 152 is triggered only upon termination of the pulse.

The sixth bit of the ticker code is customarily used to indicate whether upper or lower case characters are to be printed. This sixth bit is derived from the 0-output 159 of the sixth stage of buffer register 126. The alphabetic characters are generally upper case, and the numeric characters are lower case. Accordingly, except for certain special quotations (e.g. those involving preferred stocks), when the sixth bit changes to a mark (line 159 goes negative), it indicates the beginning of a quotation which is preceded by the alphabetic identifying code thereof; and when it changes to a space (line 159 goes positive), it indicates the beginning of the numeric portion of the quotation. This sixth bit is used to separate the alphabetic from the numeric portion (i.e. to provide a blank display separation). Line 159 is connected to the T-input of FF–161 (connected as a pulse-former). Thereby, each time that the 6th-bit line 159 goes positive (which is at the leading edge of the character-complete signal), a pulse is generated which is inverted and applied to the T-inputs of the three Row counters 154, 156, 158 to step whichever one is then operating. Thus, these counters are stepped each time a new character-complete indicates a new character is ready for display and an extra step for each quotation at the beginning of the numeric portion.

The 6th-bit line 159 is also connected via an inverter 160 to the T-input of a pulse-former FF–162, which is triggered whenever the 6th-bit line goes negative to generate a pulse at the 0-output thereof, which is inverted and used to set a flip-flop 164. The 0-output of FF–164 goes low under these conditions representing the beginning of a new quotation, and this signal is used as the destroy-storage signal applied to FF-152. Thereby, the character-complete signal does not trigger FF–152 and does not step the Row counters under this condition, which normally represents the beginning of a new transaction. Thus, the stepping of the display is prevented, which would otherwise produce a blank as the first character of a new quotation line. The destroy-storage signal is also applied as an enabling signal to three gates 166, 168, and 170, which also respectively receive different signals Reset-A, -B, and -C. The outputs 167, 169, and 171 of the latter gates provide the destroy-storage -A, -B, and -C signals, respectively.

The pulse generated by FF–162 representing the beginning of a new transaction is inverted and applied via line 173 to the T-input of a transaction counter 172. The latter is a 2-stage binary counter providing a count of 4. Also applied to the T-input of this counter 172 via line 173 are the outputs of three gates 174, 176, 178. The latter respectively receive as their inputs 175, 177, 179, certain outputs of the Row A, B, and C counters 154, 156, 158 corresponding to a count-of-12 in each thereof. Thus, the transaction counter 172 is stepped whenever one of the Row counters is stepped through a count of 12 corresponding to a condition of the associated display Row 42, 44, or 46 being full. The different outputs 181 of the transaction counter 172 are applied combinatorially to four gates 180, 182, 184, and 186 in accordance with different ones of the four counts through which the counter 172 is stepped. Thus, on a count of zero, gate 180 is enabled to generate a low-level Reset-A signal on line 183, gate 182 on the count of 1 generates the Reset-B signal on line 185, and gate 184 on the count of 3 generates the Reset-C signal on line 187. Gate 186 on the count of 4 generates a high signal that enables the 0-input of a pulse-former 188, which is set upon receipt of the next new transaction signal on line 173. The pulse from FF-188 is effective to reset the counter 172 to the count of zero to bypass the count of 4 (except if four display rows are utilized, in which case a Reset-D signal would be generated for the corresponding logic thereof). The Reset-A, -B, and -C signals are respectively applied to the R-inputs of the Row counters 154, 156, and 158 to reset those counters at appropriate times. The commutators 52, 56, and 58 of FIG. 1 are each comprised of a Row counter and a Decoder. Thus, for example, Commutator A 52 may be considered as including Row A Counter 154 and Decoder A 192.

The outputs of Row A counter (two from each stage) are connected combinatorially to twelve gates 190 (only one of which is shown) in decoder 192. All of these gates 190 also receive the character-complete signal, and only the first gate (which receives the combination of inputs corresponding to the reset condition of the row A counter 154) receives the Reset-A signal. The gates 190 respectively provide control signals on the twelve output lines 194–196 via suitable amplifiers 197 as the Row counter 154 is stepped through the twelve states representing counts zero to 11. In a similar fashion, a decoder 198 decodes the outputs 177 of the Row B counter to provide control signals on twelve output lines 200–202; and a third decoder 204 decodes the Row counter outputs 179 to generate control signals on lines 206–208.

When the low Reset-A signal is generated on line 193 at the count of zero in transaction counter 172, it releases the Row A counter for stepping and Decoder A for operation. At that time, the other Reset lines 185 and 187 are high, whereby the Row-B and -C counters are held reset so that they cannot be stepped, and the associated first gates 190 of the Decoders B and C are inhibited to prevent the generation of control signals on the first control lines 200 and 206 thereof. The application of the positive-going character-complete signal on line 125 disables the gates 190 during that signal which is when the information bits are being transferred into the buffer register 126. Thereby, no control signals are generated on the lines 194–196 during this transfer condition.

Figure 6:
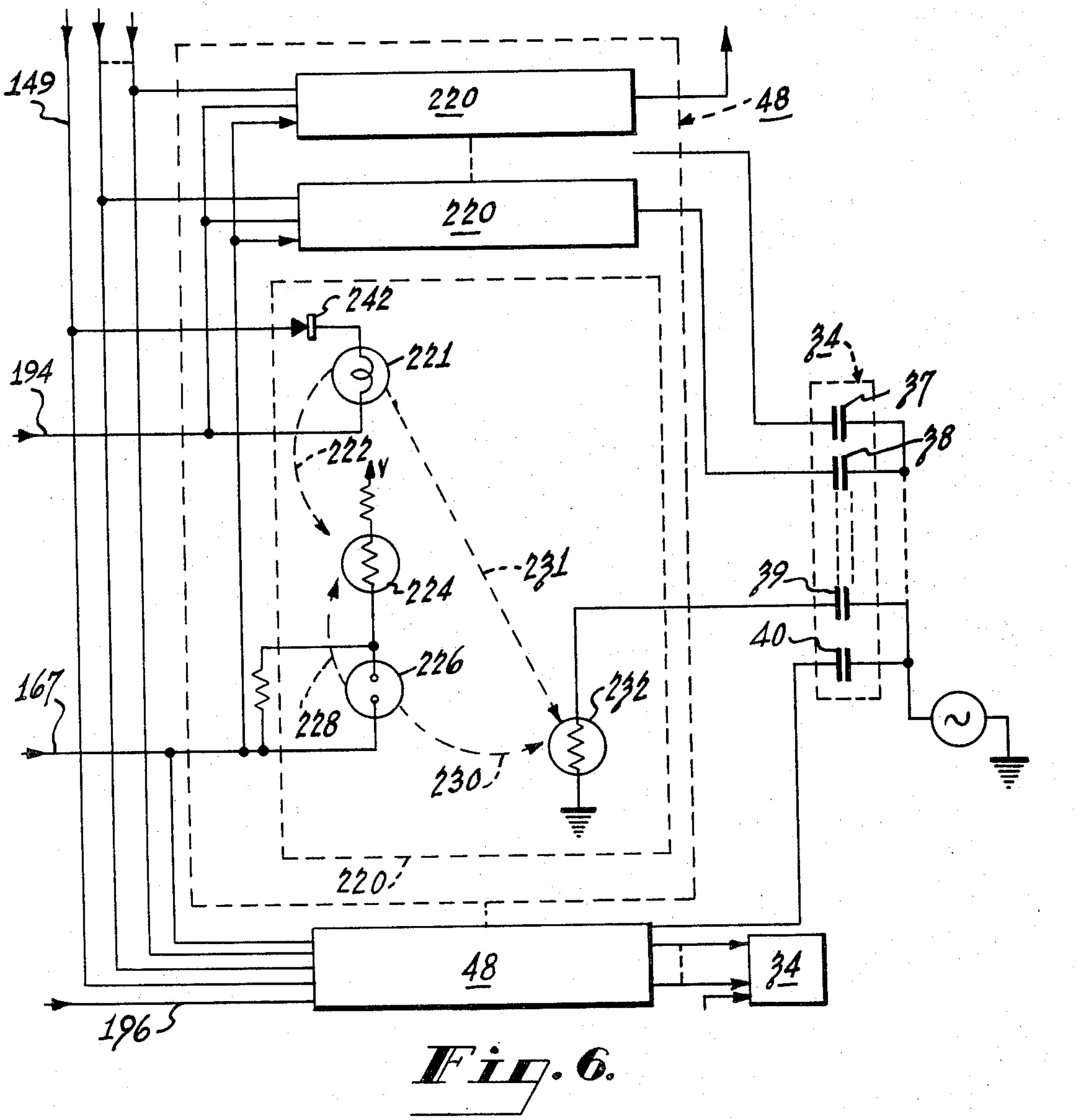
FIG. 6 is a schematic circuit and block diagram of a plurality of segments of a display section and of the storage circuits for each segment.

In FIG. 6 a storage circuit 220 is shown which is typical of those used in the storage sections 48. A separate such circuit 220 is provided for operating each of the electroluminescent segments 37–39 of the associated display character, and the dot segment 40 of the preceding character. Each storage section 48 includes fifteen storage circuits 220. Each storage circuit is the same and includes a lamp 221 having one side connected to a different one of the fifteen lines 149 of the encoder 28. The other side of the lamp is connected to one of the lines 194 of the decoder 192 associated with Row A. Light from the lamp 221 is channelled along a path 222 to a photoconductive cell 224 which is connected in a series circuit with a voltage source, a neon gas diode 226, and the line 167 for Destroy-Storage-A signals. Light from the neon tube 226 is channelled via path 228 back to the photocell 224 and via path 230 to a photoconductor cell 232. The latter cell also receives light directly from lamp 221 via path 231 and is connected between ground and one of the segments 37–40 of the associated display character 34. The storage circuits 220 may be fabricated as enclosed light-tight units in which the elements 221, 224, 226, 232 are all open to each other, and special light conducting paths 221, 228, 230, 231 need not be provided. A current-limiting resistor is connected in series with photoconductor 224, and a resistor is connected across neon lamp 226 to reduce the voltage thereacross in the off condition.

All of the circuits 220 of the same storage section 48 are connected to the same commutator line 194, and each section 48 receives a different one of the lines 194–196. The information lines 149 from the encoder 28 are respectively connected to different ones of the fifteen storage circuits 220. All of the storage circuits 220 in each one of the sections 48 of the Row A display are connected to the line 167 for the Destroy-Storage-A signal. The other storage sections 48 are constructed in a similar fashion except that each one of them receives a different one of the commutator lines from the decoder 192. Corresponding ones of the circuits in each of the storage sections 48 are connected to the associated information lines 149 from the encoder 28. The storage sections 49 and 51 of the Row B and C displays are similarly constructed.

In operation, the lamp 221 is energized when the commutator line 194 is energized and a proper information signal appears on the associated information line 149. The light from the lamp causes the photocell 224 to conduct to energize the neon tube 226, which in turn supplies light back to the photocell 224 to latch the circuit in the "on" condition. This operation of the neon lamp 226 takes place in the absence of a Destroy-Storage-A signal on line 167. Light from the neon lamp 226 also renders the photocell 232 conductive to energize the associated electroluminescent cells 39 as to illuminate the associated segment of the display character 34. Due to the latching of photocell 224 by the light from the neon tube 226, the storage circuit remains in this set condition once the proper combination of signals appears on lines 149, 167, and 194 and even after the signals are removed. Accordingly, the electroluminescent cell 39 remains in the energized state and continues the illumination until the storage circuit 220 is reset by a Destroy-Storage-A signal on line 167. Due to the light path 231, the photoconductor is illuminated directly by lamp 221 even though the Destroy-Storage-A signal prevents firing of neon lamp 226. The latter, however, completes the storage operation. Each of the other storage circuits 220 operates in a similar fashion to store the signal received from the associated one of the input lines 149 and to produce the appropriate state in the associated segments 37–39.

After the first storage section 48 and associated display character 34 are operated by the commutator signal on line 194, the commutator signal is stepped to the next line 196 to operate the next storage section 48 and associated display character 34. For convenience in displaying fractions with an economy of equipment, the fraction is preceded by a dot in the preceding display character. That is, the dot 40 of one display 34 is energized by the associated storage circuit of the next section 48. Thereby, when a fraction is decoded, the dot in the preceding character is established and just the numerator portion of an equivalent eighth fraction displayed in the appropriate section. This presentation mode is illustrated in FIG. 1.

The overall operation of the display section is described by considering the conditions at the completion of a full stock transaction display in Row A of the display. The counts of zero to 11 have established the twelve characters of the Row A display, and the next character-complete signal signifies the start of a new display row, the first character of which is being transferred into the buffer register 126. The transaction counter 172 is then reset at a zero count, the Row B and C counters are being held reset, and the Row A counter is being stepped to a count of 12. Gate 174 is enabled by this count of 12 to step the transaction counter 172 to a count of 1 and to set the flip-flop 164. The transaction counter 172 generates the low Reset-B signal via gate 182, and the latter in turn generates the Destroy-Storage-B signal via gate 168. The Destroy-Storage-B signal resets all of the storage circuits 220 of sections 49 for the entire Row B. At the same time, the Row B counter 156 is released, and the Row A and C counters are reset by the signals on lines 183 and 187.

At that time, the new character to be displayed has been established in the buffer register 126 and decoded and re-encoded onto lines 149. The enabling commutator signal is generated on the first line 200 to light the lamps 221 in each of those circuits of the first storage section 49 that receives an appropriate signal on the corresponding line 149 from the information encoder 28. The corresponding photoconductors 232 are illuminated via paths 231 to energize the corresponding ones of the segments 37–39 of the first display section in Row B and display the first character. This condition is maintained by the character stored in the buffer register 126.

While the second character is being received from the ticker line and established in the input register 86, a blank signal is generated on line 240 at the count of 4 in the counter 120 (corresponding to the fourth bit being received), and that signal resets the flip-flop 164 to terminate the Destroy-Storage-B signal on line 169. Thereby, the neon tube 226 of each of the circuits 220 in which the associated lamp 221 is lit is also ignited to latch the associated photocell 224 and thereby store the character signals. Accordingly, the corresponding photoconductors 232 continue to be illuminated and to maintain the display of the first character after the commutator signal is removed from the first line 194.

When the second character is completely set up in the input register 86, the next character-complete signal transfers it to the buffer register and steps the Row-B counter to the count of 1. The decoder 198 establishes an enabling signal on the second output line 202 associated with the second storage section 49 and the second display character. This second character is established as soon as the enabling signal is supplied by the decoder 198 and the information signals by the information encoder 28. This process continues for each count of the counter up to a count of 11 corresponding to the twelfth display character. Upon a count of 12 the cycle repeats in the same manner as described above. If this count of 12 should correspond to a thirteenth character in a transaction, this thirteenth character is set up in the first character of the Row C display with the Reset C and Destroy-Storage-C signals being established in the same manner as described above.

When a new upper case is indicated by the 6th-bit line 159 going negative, this signal develops a pulse from FF–162 which sets FF–164 and steps the transaction counter 172 in a manner siimlar to that described above. Accordingly, the appropriate Reset and Destroy-Storage signals are generated, the next Row counter is made active by its Reset signal going low, and the process is repeated. However, when a new upper case signal is supplied, the trailing edge of the character-complete signal associated therewith is blocked at the pulse-former 152 by the Destroy-Storage signal on line 165 so that the active Row counter is not stepped from its count of zero. As a result, the first character associated with this new upper case is established in the first display element 34 of the row. The succeeding characters are then displayed in the manner described above.

Various types of logic modes may be utilized in place of the NOR logic described above, and various types of circuits may be used for the modules described above. Suitable forms of these are well known in the art. One set of electronic circuits which has been found appropriate for the purpose is described in the copending patent application, Ser. No. 149,913, filed Nov. 3, 1961, now Patent No. 3,281,788. Transistor and diode circuits may be used throughout the logic. A circuit that has been found suitable for driving the lamps 221 includes the emitter-collector path of a PNP transistor amplifier in each output line 149 of the encoder 28 connected via a diode 242 and the lamp filament 221 in each associated storage circuit 220 to the collector-emitter path of a NPN transistor amplifier in each output line 194–196, 200–202, 206–208 of the commutator decoders. When these transistors at each end are rendered conductive, the associated lamps are energized. The diodes 242 block spurious sneak paths.

Thus, this ticker tape display system is readily constructed as an electronic system which may be operated at high speed and which can be readily adapted to accommodate changes and increases in speed of the ticker transmission rates. The system does not involve any moving parts and is noiseless and does not require the loading or disposal of paper tape. Due to the use of a separate decoder-encoder system, and the use of a segmental display, changes in code characters are readily made by relatively simple modifications of the encoder logic.

The display system is sufficiently flexible to take care of each normal quotation on a separate line and yet provide for the display of extra long quotations or special messages using a plurality of lines. The display may be formed in a large size for easy viewing in large broker rooms. The display of a quotation can be maintained over a substantial time period, and for convenience in reading, an entire quotation is presented in static form.

What is claimed is:

1. In combination with a market quotation ticker line, an electronic display system comprising a plurality of character displays and associated circuits, each of said character displays being formed of a plurality of display segments that are combinatorially energized to form different characters, means including a shift register for registering successive serial signal bits from said ticker line and forming coded signal characters therefrom, said means further including means responsive to certain signals from said ticker line for developing shift pulses for said shift register, means for counting said shift pulses and developing a first control signal upon reaching a predetermined count in accordance with the number of bits in a complete market quotation character and means responsive to said first control signal and to a combination of the first and last bits established in said register for developing a second control signal upon each successive character being established in said register, means for changing said coded signal characters to signal combinations for combinatorially energizing the display segments of each of said display characters, and commutator means responsive to said second control signals for enabling successively the character display circuits to display the successive characters of each market quotation.

2. The combination of claim 1 wherein said display segments are electroluminescent devices.

3. The combination of claim 2 wherein said circuits include a separate circuit connected to each of said electroluminescent devices for storing the energizing signal therefor.

4. An electronic display system for displaying market quotations in accordance with signals received from a ticker line, said system comprising means including an input shift register for receiving serial space and mark signals from the ticker line and for establishing a parallel coded signal character in accordance therewith, means for synchronizing the register operation to the ticker signal transmission including a clock generator having a counter frequency divider for supplying clock pulses at a higher rate than the ticker signal rate, means responsive to certain signals from the ticker line for developing successive shift pulses for said shift register at said ticker signal rate and occurring at about the center of each of said ticker signals, means for counting said shift pulses and for developing a first control signal when a certain size ticker character is established in said register, means responsive to said first control signal and to a certain combination of the first and last bits of the registered ticker character for developing a second control signal, said means for developing the shift pulses being continuously oeprative to develop said shift pulses until the development of said second control signal and being rendered inoperative thereby, and means responsive to said second control signal including a decoder for developing decoded signals representative of the registered ticker character.

5. An electronic display system for displaying market quotations in accordance with signals received from a ticker line, said system including means for establishing coded signal characters from the serial bits of the ticker line, a plurality of row displays each including a plurality of character displays, and including a plurality of storage circuits respectively connected to the character displays, each of said storage circuits being connected to receive said coded signals, a plurality of commutators, one for each of said row displays, each of said commutators including a counter and a decoder for the outputs thereof to supply enabling signals successively to the storage circuits of the associated row display, means for stepping an active one of said commutator counters upon the establishment of each of said signal characters and upon the change of signal form of a certain bit of the registered ticker character to indicate a numeric character, means for successively activating one of said commutator counters at a time including a transaction counter, and means for stepping said transaction counter upon the development of a certain count in the active one of said commutator counters and upon the change of signal form of said certain ticker character bit to indicate an alphabetic character and for destroying the storage of the row storage circuits associated with the activated one of said commutator counters.

6. An electronic display system for displaying market quotations in accordance with signals received from a ticker line, said system comprising means including an input shift register for receiving serial space and mark signals from the ticker line and for establishing a parallel coded signal character in accordance therewith, means for synchronizing the register operation to the ticker signal transmission including a clock generator for supplying clock pulses at a higher rate than the ticker signal rate, means responsive to certain signals from the ticker line for developing successive shift pulses for said shift register at said ticker signal rate and re-occurring at a certain time relation to each of said ticker signals, means responsive to said shift pulses for developing a first control signal when a certain size ticker character is established in said register, means responsive to said first control signal and to a certain combination of the first and last bits of the registered ticker character for developing a second control signal to terminate the development of said shift pulses, means responsive to said second control signal for developing combinatorial coded signals representative of the registered ticker character, a plurality of row displays each including a plurality of character displays, each of said character displays being made up of a plurality of display segments arranged so as to form visible displays of different alphabetic and numeric characters when different combinations thereof are energized and including a group of storage circuits respectively connected to the display segments, each of said storage circuits of each of said groups being connected to receive a different one of said combinatorial coded signals; a plurality of commutators, one for each of said row displays, each of said commutators having an inactive condition and an active condition to supply enabling signals successively to the storage circuit groups of the associated row display, means for stepping an active one of said commutators upon the development of each of said second control signals and upon the change of signal form of a certain bit of the registered ticker character to indicate a numeric character, means for successively activating one of said commutators at a time upon the active one of said commutators being stepped to a certain state and upon the change of signal form of said certain ticker character bit to indicate an alphabetic character and for destroying the storage of the row storage circuits associated with the active one of said commutators.

7. An electronic display system for displaying market quotations in accordance with signals received from a ticker line, said system comprising means including an input shift register for receiving serial space and mark signals from the ticker line and for establishing a parallel coded signal character in accordance therewith, means for synchronizing the register operation to the ticker signal transmission including a clock generator having a counter frequency divider for supplying clock pulses at a higher rate than the ticker signal rate, means responsive to certain signals from the ticker line for developing successive shift pulses for said shift register at said ticker signal rate and occurring at about the center of each of said ticker signals, means for counting said shift pulses and for developing a first control signal when an eight-bit ticker character is established in said register, means responsive to said first control signal and to a certain combination of the first and last bits of the registered ticker character for developing a second control signal, means responsive to said second control signal including a decoder for developing decoded signals representative of the registered ticker character, means responsive to said decoded signals including an encoder for developing combinatorial coded signals; a plurality of row displays each including a plurality of character displays, each of said character displays being made up of a plurality of electroluminescent display segments arranged so as to form light displays of different alphabetic and numeric characters when different combinations thereof are energized and including a group of storage circuits respectively connected to the display segments, each of said storage circuits of each of said groups being connected to receive a different one of said combinatorial coded signals from said encoder; a plurality of commutators, one for each of said row displays, each of said commutators including a counter and a decoder for the outputs thereof to supply enabling signals successively to the storage circuit groups of the associated row display, means for stepping an active one of said commutator counters upon the development of each of said second control signals and upon the change of signal form of a certain bit of the registered ticker character to indicate a numeric character, means for successively activating one of said commutator counters at a time including a transaction counter, and means for stepping said transaction counter upon the development of a certain count in the active one of said commutator counters and upon the change of signal form of said certain ticker character bit to indicate an alphabetic character and for destroying the storage of the row storage circuits associated with the activated one of said commutator counters.

8. An electronic display system including a display board for displaying alpha-numeric characters in accordance with mark and space signals received on an input line, said system comprising means including a shift register for receiving said signals from said input line and for establishing a parallel coded character in accordance with said signals, means responsive to certain signals from the input line for developing successive shift pulses for registering the mark and space signals from said input line in said register, means for counting said shift pulses and for developing a first control signal when a certain size character is established in said register, means responsive to said first control signal and to a combination of certain registered bits in said shift register for developing a second control signal, said means for developing shift pulses being rendered inoperative to produce further pulses upon receipt of said second control signal, decoding means responsive to said parallel coded character for developing signals representative of said character for operating said display board in accordance with said character, and means responsive to said second control signal for establishing in said display board the signals developed by said decoder.

9. The combination of claim 12 wherein said second control signal is developed on each successive character and said display board includes a plurality of character displays and associated circuits, and further including a commutator means responsive to said successive second signals for enabling successively the character diplays whereby the alpha-numeric characters represented by said successively registered characters are displayed in successive character displays.

References Cited

UNITED STATES PATENTS

| | | | |
|---|---|---|---|
| 2,181,682 | 11/1939 | Scheidegger | 340—154 |
| 2,248,820 | 7/1941 | Haselton | 340—154 |
| 3,011,153 | 11/1961 | Haselton et al. | 340—154 |
| 3,106,696 | 10/1963 | Foley | 340—154 |
| 2,953,776 | 9/1960 | Blutman | 340—336 X |

JOHN W. CALDWELL, *Primary Examiner.*

H. I. PITTS, *Assistant Examiner.*

U.S. Cl. X.R.

235—92; 340—334